N. ZYLIEWICZ.
CANDLE HOLDER.
APPLICATION FILED SEPT. 7, 1912.
Reissued Oct. 15, 1912. 13,481.
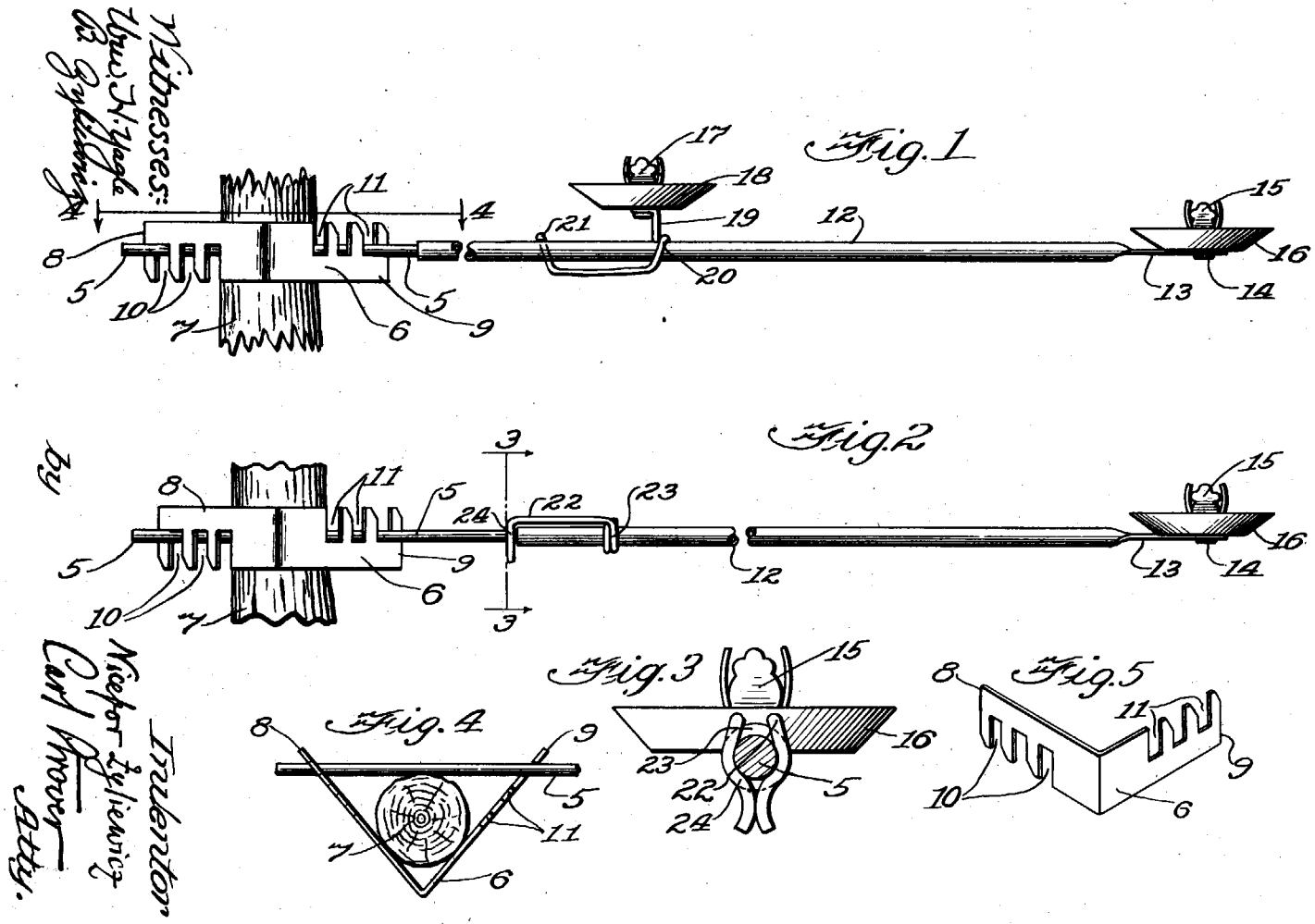
COLUMBIA PLANOGRAPH CO., WASHINGTON, D. C.

UNITED STATES PATENT OFFICE.

NICEFOR ZYLIEWICZ, OF CHICAGO, ILLINOIS.

CANDLE-HOLDER.

Specification of Reissued Letters Patent. Reissued Oct. 15, 1912.

13,481.

Original No. 1,034,752, dated August 6, 1912, Serial No. 670,708. Application for reissue filed September 7, 1912. Serial No. 719,690.

*To all whom it may concern:*

Be it known that I, NICEFOR ZYLIEWICZ, being a citizen of the United States, and a resident of the city of Chicago, county of Cook, and State of Illinois, have invented a certain new and useful Candle-Holder, of which the following is a specification.

The object of this invention is to provide an inexpensive and durable candleholder, particularly adapted for use with Christmas trees, which can readily be adjusted to various lengths, and which is provided with ready and simple means to clamp the several portions into fixed positions relative to each other, and also with novel means for attachment to a vertical support.

In the drawings Figure 1 is a side elevation of my device, showing my candleholder provided with two candle sockets, one of which is mounted on a wire which is bent so as to form a clamp; Fig. 2 is a like elevation showing my candleholder provided with but one candle socket, the several portions of the holder being clamped together by an independent wire clamp; Fig. 3 is a sectional view in the plane indicated by line 3—3 in Fig. 2; Fig. 4 is a sectional view in the plane indicated by line 4—4 in Fig. 1; and Fig. 5 is a perspective view of the bracket constituting part of my device.

Referring to the drawings, metal rod 5 is attached by means of slotted bracket 6, to trunk 7 of a Christmas tree. Bracket 6 consists of a strip of springy metal, arms 8 and 9 of which preferably form an approximately right angle between them. Into arm 8 slots 10 are cut from below, while into arm 9 slots 11 are cut from above. Bracket 6 is placed against trunk 7 so as that both arms 8 and 9 are in contact therewith. Rod 5 is then placed with one of its ends into one of slots 10, and thereupon forced down into one of slots 11 so as to wedge trunk 7 between it and arms 8 and 9. Bracket 6 may be sprung a little to accomplish the proper fit. Accordingly as trunk 7 is of larger or smaller diameter, slots nearer to, or farther from the outer ends of arms 8 and 9 are chosen for the insertion of rod 5. On the other end of rod 5 is mounted slotted tube 12, to the flattened end 13 of which is attached, by rivet 14, candle socket 15, provided with drip-catcher 16. Another candle socket 17, provided with drip-catcher 18, is mounted on the end of a wire 19, which passes, with loop 20, around rod 5 and tube 12, and has its other end formed into spring 21, adapted to be hooked over rod 5 and tube 12, and adjusted so, with reference to loop 20, as to bring loop 20 into firm engagement with rod 5 and tube 12, when spring 21 is hooked over them, thereby pressing rod 5 and tube 12 into firm engagement with each other, and preventing both sliding and turning motions of tube 12 and of sockets 15 and 17 with reference to rod 5.

Where but one candle socket is to be used, as shown in Fig. 2, a wire spring 22, passing, with loop 23, around rod 5 and tube 12 and having its ends formed into a spring clamp 24, adapted to be pushed over rod 5 and tube 12, and to engage these members between them, is employed to bind rod 5 and tube 12 into firm engagement with each other.

I claim,

1. In candleholders, the combination, with a stem provided with fastening means at one end, of a slotted tube slidably mounted on the stem; a candle socket attached to the outer end of the tube; and a wire clamp, carrying an additional candle socket, mounted on the stem and the tube, for the purpose described.

2. In candleholders, the combination, with a stem, and candle sockets carried by the stem, of a slotted clamp adapted to coöperate with the stem in attaching the candleholder to a vertical support, substantially as described.

3. In candleholders, the combination, with a stem, and candle sockets carried by the stem, of a clamp having two arms placed at approximately right angles to each other, one of said arms being slotted from below, and the other arm being slotted from above, said clamp being adapted to coöperate with the stem in attaching the candleholder to a vertical support, substantially as described.

NICEFOR ZYLIEWICZ.

Witnesses:
JOHN BIELAWSKI,
B. ZYLIEWICZ.

Copies of this patent may be obtained for five cents each, by addressing the "Commissioner of Patents, Washington, D. C."